United States Patent Office 3,835,077
Patented Sept. 10, 1974

3,835,077
POLYURETHANE-TAR COMPOSITION
Kenjiro Mori, Takarazuka, Yasuzi Takemoto, Sakai, and Shigueaqui Ikebe, Toyonaka, Japan, assignors to Sumitomo Chemical Company, Limited
No Drawing. Filed Oct. 4, 1972, Ser. No. 294,947
Int. Cl. C08g 51/52
U.S. Cl. 260—28          8 Claims

ABSTRACT OF THE DISCLOSURE

A composition containing a urethane prepolymer, a hardener and cresol tar which is the distillation residue having a boiling point of not lower than 200° C. in the preparation of cresols using cymene, the composition being useful as a water-proof material for building materials.

---

The present invention relates to a polyurethane-tar composition. More particularly, it relates to an improvement in a polyurethane-tar composition.

As a water-proof material for building materials, asphalt has been used. But, it is defective in being made fragile at a low temperature, softened at a high temperature and inferior in solvent resistance. There has also been used an epoxy-tar composition. This overcomes such defects as seen in asphalt but is somewhat inferior in flexibility and can hardly be cured at a low temperature.

Recently, a polyurethane-tar composition has been developed as a water-proof material, a road coking material, an anticorrosive material, a joint seal material and the like. The polyurethane component in such polyurethane-tar composition is a urethane prepolymer having isocyanate groups at both ends, which is prepared by the reaction between a hydroxyl compound with an excess amount of a polyisocyanate. The tar component is coal tar or coal tar pitch, particularly a mixture of coal tar pitch with anthracene oil obtained by the distillation of crude tar at a temperature of not lower than 300° C., for instance, according to the procedure disclosed in Kobunshi Kako, *19*, 736 (1970). The polyurethane-tar composition is less expensive and has excellent water resistance, elasticity and weather-proof property. However, it cannot be employed as a colorable water-proof material, because of the black color due to the tar component. Further, it cannot be stably stored for a long duration of time because the hardener contained therein is apt to precipitate because of its low solubility. Moreover, the tar component inevitably contains a nitrogen-containing compound harmful to human beings as well as carcinogenic benzpyrene, and the handling of the polyurethane-tar composition containing such tar component is very troublesome.

In order to overcome the said defects in the conventional polyurethane-tar composition containing coal tar as the tar component, various investigations have been made. As the result, it has been found that the use of cresol tar as the tar component can provide a polyurethane-tar composition having various advantageous properties, compared with the conventional one.

The polyurethane-tar composition of the present invention comprises a urethane prepolymer, a hardener and a tar, the tar being cresol tar, i.e. the distillation residue having a boiling point of not lower than 200° C. in the preparation of cresols using cymene.

The cresol tar is the distillation residue in the preparation of cresols using cymene according to the so-called cymene method which comprises oxidizing cymene to cymene hydroperoxide and decomposing the latter to give a reaction mixture containing acetone and cresol. Removal of the substances having low boiling points such as acetone, unreacted cymene and dimethylstyrene and then cresol from the said reaction mixture by rectification leaves the distillation residue which is utilizable as the tar component in the polyurethane-tar composition of the invention. The distillation residue is a mixture of the substances having high boiling points such as 200° C. or higher, preferably having boiling points not lower than 260° C. at 760 mm. Hg. among which those having an active group(s) such as phenolic hydroxyl, alcoholic hydroxyl, acetyl and aldehyde groups may be contained. The fraction collected within a range between 200° C. (preferaby 260° C.) and 350° C. can be used for a colorable water-proof material. The residual fraction, i.e. pitch wise residue, may be used for a black composition in the form of a solution in an appropriate solvent such as an aromatic solvent (e.g. benzene, toluene, xylene) or anthracene oil obtained from coal tar.

The hardener may be an active hydrogen-containing compound as used in the conventional polyurethane-tar composition. Examples of the preferred hardener are polyalkylene oxides (e.g. polyethylene oxide, polypropylene oxide, 4,4'-methylene-bis(2-chloroaniline), 4,4'-di-aminodiphenylmethane, etc. These hardeners may be employed in combination, i.e. in a mixture.

As the urethane prepolymer, there may be used conventional prepolymers having isocyanate groups at both ends, for example, such prepolymers as prepared by the reaction between a hydroxyl compound with an excess amount of a polyisocyanate according to a known procedure. Examples of the polyisocyanate are tolylenediisocyanate, 1,5 - naphthylenediisocyanate, 4,4' - diphenyl-methanediisocyanate, hexamethylenediisocyanate, xylylenediisocyanate and polymethylenepolyphenylenediisocyanate. The hydroxyl compound includes, for example, polyesters, castor oil and tall oil, and the most preferables are polyalkylene oxides disclosed in Kobunshi Kako, *19*, 734 (1970).

In carrying out the present invention, more detailed explanations are given as follows.

The cresol tar is used in an amount of 50 to 200 parts by weight based on 100 parts by weight of the urethane prepolymer, and the hardener is used in an amount of 0.5 to 3 equivalents to the isocyanate group contained in the urethane prepolymer. In practical use, the hardener is dissolved in advance in the cresol tar by a suitable manner, and 0.2 to 2 parts by weight of the resulting solution is mixed with 1 part by weight of the urethane prepolymer. The thus obtained composition is, for example, coated on a material, e.g. a building material by, means of a conventional application procedure such as brush coating. When a quick curable hardener is used, the solution of the hardener in the cresol tar and the urethane prepolymer are separately introduced into a sprayer, and the mixture is sprayed on a material to be coated as fast as possible. The curing may be sufficient at room temperature.

The polyurethane-tar composition of the invention may further contain fillers, various organic solvents, organic tin compounds, anti-oxidants, ultraviolet ray absorbers and the like, as in the conventional polyurethane-tar composition.

The polyurethane-tar composition of the invention has an excellent water resistance property as the conventional one does and is superior in rubber properties to the latter. Different from the conventional polyurethane-tar composition, almost no precipitation of the hardener is observed, even after the elapse of a long duration of time. This is due to the good solubility of the hardener into the cresol tar. A colorable water-proof material can be obtained when the fraction of the cresol tar collected at a distillation temperature between 200° C. and 350° C. is used. Since neither a nitrogen-containing compound harmful to human beings nor benzpyrene is included in the cresol tar, the polyurethane-tar composition of the invention can be handled without any trouble. Moreover, it should be noted that the evaluation of the cresol tar, which has heretofore been used only as a fuel, is heightened by the present invention which provides a new use therefor.

Practical and presently preferred embodiments of the invention are shown in the following Examples for illustration, not for limitation. In the Examples, parts are by weight.

EXAMPLE 1

A mixture of cresol tar (black liquid; specific gravity (d 25/4), 1.047; boiling point, 230° C. or higher; Engler viscosity (50/20), 3) (100 parts), polyoxypropyleneglycol (average molecular weight, 400) (40 parts) and 4,4'-diaminodiphenylmethane (10 parts) is heated at 80° C. to make a uniform solution. A mixture of the resulting solution (1.5 parts) and a urethane prepolymer (pale yellow viscous liquid; viscosity, 7000 cps./25° C.) (1 part) was introduced quickly into a mould having 2 mm. of thickness and cured at room temperature. After standing for 14 days under the test conditions disclosed in Kobunshi Kako, 20, 309 (1971), the tensile strength, elongation and hardness were measured according to JIS (Japan Industrial Standard) K–6301, the shape of the specimen being No. 3 type dumbbell.

The above-mentioned procedure was repeated but using coal tar (refined tar produced by Osaka Gas Co. in Japan) in place of the cresol tar.

The results are shown in Table 1.

TABLE 1
[Physical properties of the specimens]

| Tar | Treatment with boiling water | Tensile strength (kg./cm.²) | Elongation (percent) | Hardness (Hs) | Color |
|---|---|---|---|---|---|
| Cresol tar | Before | 12 | 310 | 32 | Transparent brown. |
|  | After | 10 | 320 | 25 | Do. |
| Coal tar | Before | 9 | 245 | 30 | Cloudy black. |
|  | After | 7 | 260 | 21 | Do. |

Still, the solubility of 4,4'-diaminodiphenylmethane at 25° C. is about 40 parts to 100 parts of the cresol tar and about 1.5 parts to 100 parts of the coal tar.

EXAMPLE 2

Cresol tar pitch freed from fractions of not higher than 350° C. (black solid pitch; viscosity, 370 cps./85° C.) (50 parts) was dissolved in anthracene oil (50 parts), and the resulting solution was admixed with 4,4'-methylene-bis(2-chloroaniline) (13.6 parts) at 80° C. to make a uniform solution, which was then admixed with xylene (20 parts). A mixture of the resultant mixture (1.5 parts) and a urethane prepolymer (pale yellow viscous liquid; viscosity, 7000 cps./25° C.) (1 part) was introduced into a mould having 2 mm. of thickness and cured at room temperature. After standing for 14 days, the tensile strength, elongation and hardness were measured according to JIS–K–6301, the shape of specimen being No. 3 type dumbbell.

The above-mentioned procedure was repeated but using coal tar pitch (tar pitch produced by Osaka Gas Co.) in place of the cresol tar pitch.

The results are shown in Table 2.

TABLE 2
[Physical properties of the specimens]

| Tar | Treatment with boiling water | Tensile strength (kg./cm.²) | Elongation (percent) | Hardness (Hs) | Color |
|---|---|---|---|---|---|
| Cresol tar pitch. | Before | 10 | 455 | 30 | Transparent dark brown. |
|  | After | 9 | 465 | 28 | Do. |
| Coal tar pitch. | Before | 8 | 243 | 30 | Cloudy black. |
|  | After | 7 | 250 | 25 | Do. |

EXAMPLE 3

A medium fraction of cresol tar collected at a distillation temperature between 260 and 350° C. (transparent pale brown liquid; specific gravity (d 25/4), 1.019) (100 parts), polyoxypropylene glycol (average molecular weight, 3000) (40 parts) and 4,4'-diaminodiphenylmethane (10 parts) were mixed at 80° C. to make a uniform solution, and the resulting solution was mixed with whiting ("Hakuenka O" produced by Shiraishi Calcium Co. in Japan) (20 parts). A mixture of the resultant mixture (1.5 parts) and a urethane prepolymer (pale yellow viscous liquid viscosity, 11,000 cps./25° C.) (1 part) was introduced quickly into a mould having 2 mm. of thickness and cured at room temperature. After standing for 14 days at room temperature, the tensile strength, elongation and hardness were measured according to JIS–K–6301, the shape of the specimen being No. 3 type dumbbell.

The results are shown in Table 3.

TABLE 3
[Physical properties of the specimen]

| Tar | Treatment with boiling water | Tensile strength (kg./cm.²) | Elongation (percent) | Hardness (Hs) | Color |
|---|---|---|---|---|---|
| Medium fraction. | Before | 12 | 417 | 37 | White. |
|  | After | 10 | 432 | 34 | Do. |

EXAMPLE 4

A mixture of the same cresol tar as in Example 1 (100 parts) and 4,4'-methylene-bis(2-chloroaniline) was heated at 80° C. to make a uniform solution. The resulting solution (108 parts) was admixed with a urethane prepolymer ("Polyflex HT–1" produced by Daiichi Kogyo Seiyaku Co. in Japan; pale yellow viscous liquid; viscosity, 4500 cps./25° C.; free NCO group, 7.0%) (100 parts). The resultant mixture was introduced into a mould having 2 mm. of thickness and cured at room temperature. After standing for 14 days, the physical properties were measured according to JIS–K–6301, the shape of the specimen being No. 3 type dumbbell.

The above-mentioned procedure was repeated but using coal tar (refined tar produced by Osaka Gas Co.) in place of the cresol tar.

The results are shown in Table 4.

TABLE 4
[Physical properties of the specimens]

| Tar | Treatment with boiling water | Tensile strength (kg./cm.²) | Hardness (Hs) | Color |
|---|---|---|---|---|
| Cresol tar | Before | 38 | 47 | Transparent brown. |
|  | After | 34 | 44 | Do. |
| Coal tar | Before | 35 | 47 | Cloudy black. |
|  | After | 29 | 41 | Do. |

What is claimed is:

1. A polyurethane-tar composition which comprises a urethane prepolymer, a hardener and a tar, the tar being a distillation residue having a boiling point of about 200°

C. to 350° C., said residue being produced during the preparation of cresols using cymene.

2. The composition according to claim 1, wherein the combined amount of the hardener and the tar is 0.2 to 2 parts by weight based on 1 part by weight of the tar is 0.2 to 2 parts by weight based on 1 part by weight of the urethane prepolymer.

3. The composition according to claim 1, wherein the amount of the hardener is 0.5 to 3 equivalents to the isocyanate group in the urethane prepolymer.

4. The composition according to claim 1, wherein the tar is a fraction collected by distillation of the distillation residue at a temperature of 200 to 350° C.

5. In a polyurethane-tar composition comprising a urethane prepolymer, a hardener and a tar, an improvement which comprises using as the tar a distillation residue having a boiling point of not lower than 200° C., said residue being produced during the preparation of cresols using cymene.

6. A process for coating a material to make the material water-proof and corrosion-inhibited which comprises applying the polyurethane-tar composition according to claim 1 on the surface of the material.

7. The composition according to claim 1, wherein said hardener is a polyalkylene oxide, 4,4'-methylene-bis(2-chloroaniline) or 4,4'-diaminodiphenylmethane.

8. The compostion according to claim 7, wherein said hardener is a polyalkylene oxide selected from the group consisting of polyethylene oxide and polypropylene oxide.

References Cited
UNITED STATES PATENTS

| | | | |
|---|---|---|---|
| 3,412,050 | 11/1968 | Elkin | 260—28 |
| 3,468,822 | 9/1969 | Wismer | 260—28 |
| 3,615,801 | 10/1971 | Marklow | 260—28 |
| 3,092,594 | 6/1963 | Heiss | 260—28 |
| 3,182,032 | 5/1965 | Charlton | 260—28 |
| 3,372,083 | 3/1968 | Evans | 260—28 |
| 3,179,610 | 4/1965 | Wood | 260—28 |

ALLAN LIEBERMAN, Primary Examiner

P. R. MICHL, Assistant Examiner

UNITED STATES PATENT OFFICE
CERTIFICATE OF CORRECTION

Patent No. 3,835,077   Dated September 10, 1974

Inventor(s) Kenjiro Mori et al

It is certified that error appears in the above-identified patent and that said Letters Patent are hereby corrected as shown below:

In the heading of the patent, please insert the following:

--Foreign Application Priority Data:

October 4, 1971,   Japan.............78056/1971 --

Signed and Sealed this second Day of March 1976

[SEAL]

Attest:

RUTH C. MASON
*Attesting Officer*

C. MARSHALL DANN
*Commissioner of Patents and Trademarks*